April 16, 1940.  C. O. BERGSTROM  2,197,740
PRESSURE VENTILATING SYSTEM
Filed July 22, 1938  2 Sheets-Sheet 1
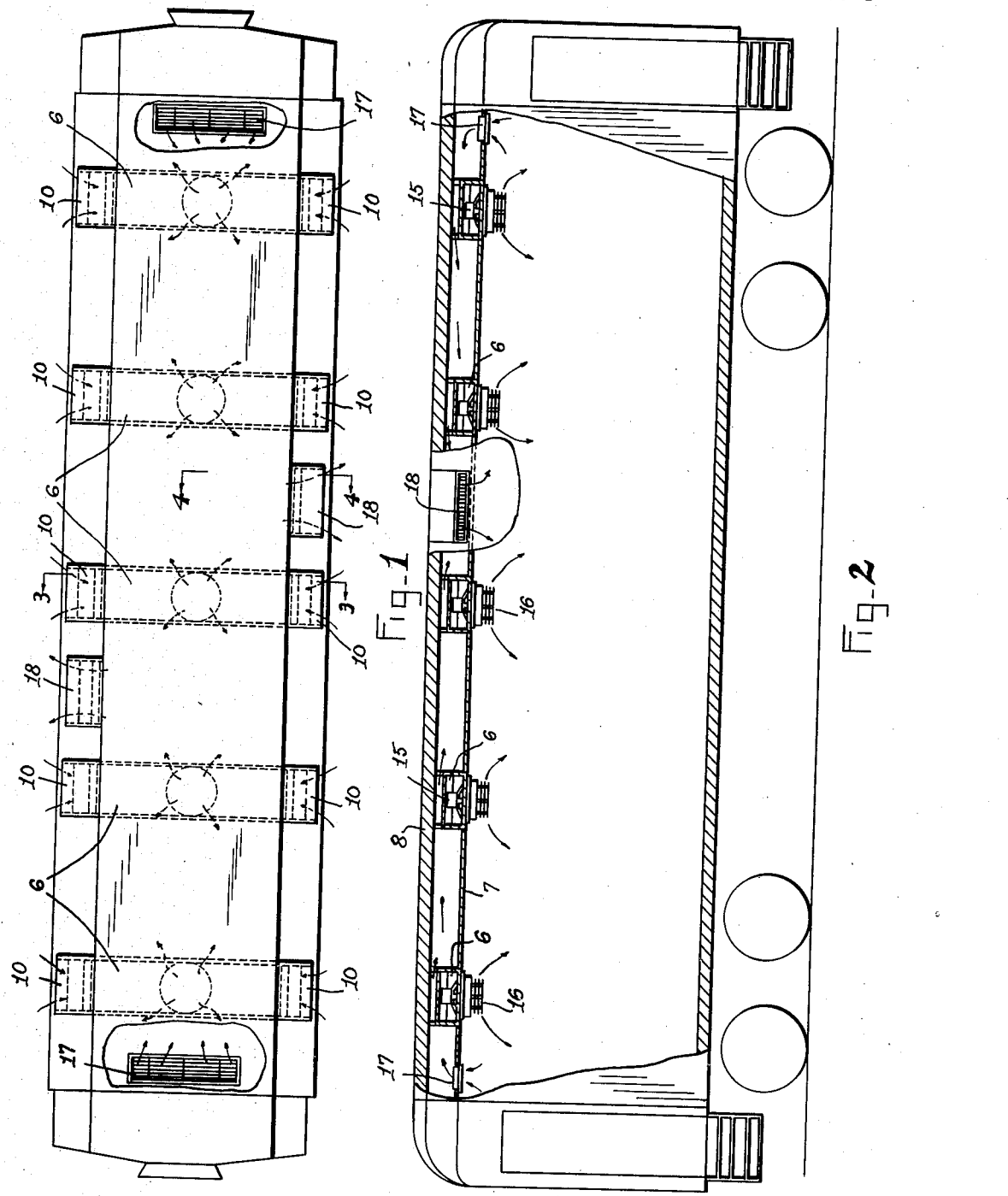
INVENTOR.
CARL O. BERGSTROM
BY
ATTORNEY.

April 16, 1940.　　　C. O. BERGSTROM　　　2,197,740
PRESSURE VENTILATING SYSTEM
Filed July 22, 1938　　　2 Sheets-Sheet 2

INVENTOR.
CARL O. BERGSTROM
BY
ATTORNEY.

Patented Apr. 16, 1940

2,197,740

UNITED STATES PATENT OFFICE 2,197,740

PRESSURE VENTILATING SYSTEM

Carl O. Bergstrom, Boston, Mass., assignor to B. F. Sturtevant Company, Boston, Mass.

Application July 22, 1938, Serial No. 220,681

3 Claims. (Cl. 98—10)

This invention relates to ventilating systems and relates more particularly to pressure ventilating systems for passenger vehicles.

Air cooling systems utilizing refrigeration for passenger vehicles such as railway passenger cars are relatively expensive to purchase and to operate; they add considerable "dead" weight to the cars which has to be carried during all of the time even though the equipment is used for cooling purposes but a relatively small portion of the time, and the equipment requires a great deal of servicing for maintaining it in operating condition.

It has been proposed heretofore to dispense with refrigeration for cooling railway passenger cars and to affect cooling by circulating large volumes of outdoor air through the cars but in such prior proposals propeller fans were to be used for blowing the air directly into the passenger space.

This invention provides a pressure ventilating system utilizing a plurality of centrifugal fans with wheels mounted just below the ceiling and communicating through openings in the ceiling with filtered outdoor air. The fan wheels extend in alignment down along the longitudinal center of the car and blow the outdoor air in substantially horizontal streams into the car. The outdoor air displaces the heated air through gravity and pressure and thus enters the passenger space, and an equal volume of air from the passenger space is exhausted from the car.

In one embodiment of the invention, a plurality of ducts extend crosswise the car with outdoor air inlets in both ends of each duct and each centrifugal fan receives air through one of the transverse ducts. Exhaust outlets in each end of the car pass the exhaust air from the car over and around the ducts to remove heated air from over and between the ducts.

An object of the invention is to cool a passenger vehicle with relatively large volumes of outdoor air.

Another and more definite object of the invention is to utilize centrifugal fans with wheels mounted horizontally below the ceiling of a passenger vehicle and communicating through the ceiling with outdoor air for cooling the passenger space with relatively large volumes of outdoor air.

Other objects of the invention will be apparent from the drawings and the following description.

The invention will now be explained with reference to the drawings, of which:

Fig. 1 is a plan view looking downwardly with portions cut away and other portions in dotted outline, of a railway car embodying this invention;

Fig. 2 is an elevation view with a portion in section, of the car of Fig. 1;

In the embodiment of the invention illustrated, the plurality of ducts 6 extend crosswise the car between the ceiling 7 and roof 8. Each duct 6 is spaced from the roof to provide space for air to flow between the ducts and the roof.

Figure 3:
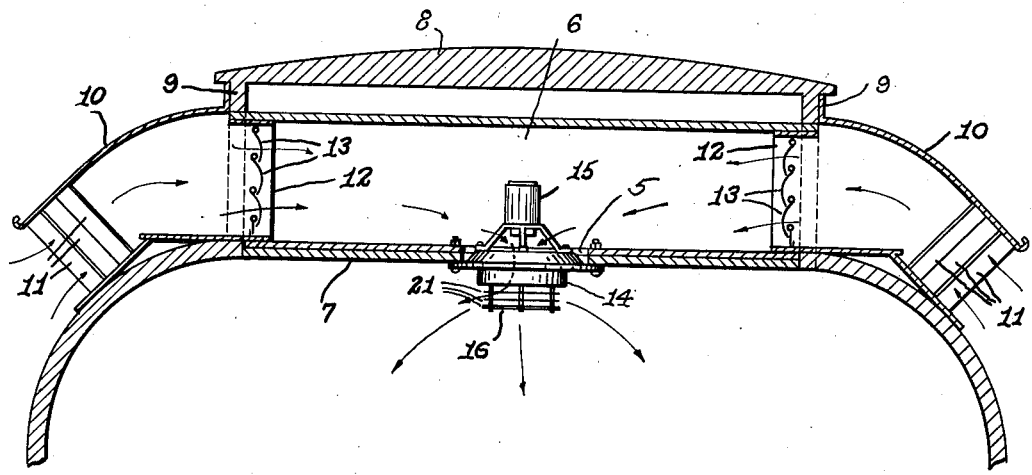
Fig. 3 is a sectional view along the lines 3—3 of Fig. 1.
Figure 4:
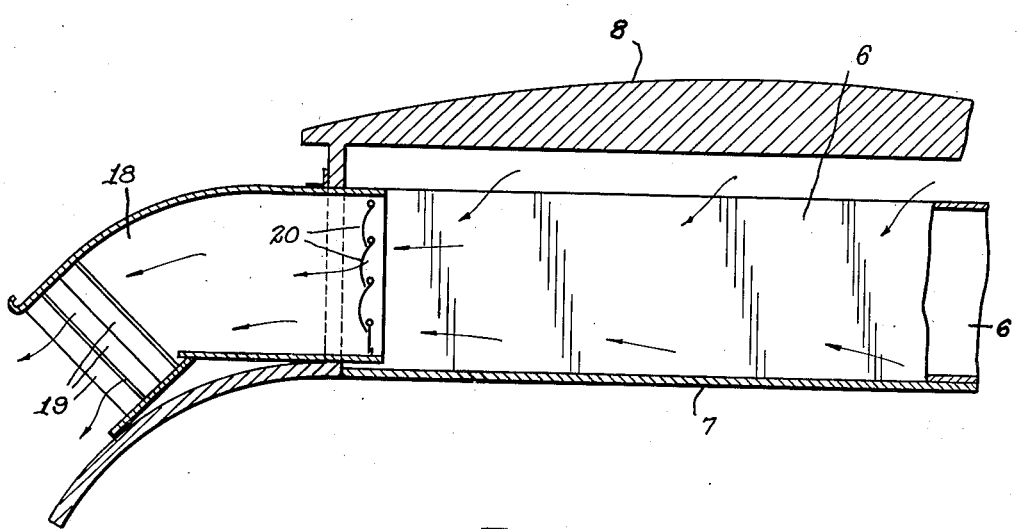
Fig. 4 is a sectional view along the lines 4—4 of Fig. 1.

Each of the ducts 6 as shown most clearly by Fig. 3, extends through the sides 9 of the car and communicates through the ventilator hoods 10 with outdoor air. The filters 11 in the entrance of the hoods serve to clean the air entering the ducts 6.

The frames 12 containing the balanced dampers 13 extend across the inlets to the ducts 6 and the dampers are adjusted to open for entry of outdoor air but to close to prevent air from being exhausted therebetween. If these dampers were not provided, a cross wind could blow through the ducts 6, interfering with the operation of the fans and causing undesirable noise.

In the center of each of the ducts 6 is mounted the centrifugal fan indicated generally by 14 and having the motor 15 mounted in the duct 6 above the ceiling 7, and having its fan wheel (not shown) and the deflector housing 16 surrounding the fan wheel, mounted below the ceiling. The lower side of the duct is apertured and the ceiling 7 is apertured at 5 around the fan shaft to permit the passage of air from the duct 6 to the fan wheel. The details of the centrifugal fan utilized are disclosed in my copending application, Serial No. 166,803, filed October 1, 1937.

The air exhaust outlets 17 are placed in the ceiling 7 at each end of the passenger space and serve to pass the air exhausted from the passenger space, into the space between the ceiling 7 and roof 8.

The roof exhaust outlets 18 are arranged adjacent the roof, one in each side of the car, and the outlet 18 in one side of the car is placed to one side of the longitudinal center of the car and the other outlet 18 is arranged to the other side of the longitudinal center of the car. The eliminators 19 prevent the entry of rain water and the balanced dampers 20 prevent the entry of outdoor air into the outlets 18. These outlets 18 exhaust the air entering the roof space through the outlets 17, from the roof space after the air has passed over and in contact with the ducts 6.

In operation the centrifugal fans 14 draw outdoor air through the filters 11, the dampers 13 and ducts 6 and through apertures in the lower sides of the ducts and in the ceiling and this outdoor air is forced in substantially horizontal, laminated streams circumferentially around the fan wheels. The horizontal deflectors 21 of the deflector housing 16 break up the air from the fan wheel into laminations. The air forced by the fans into the passenger space builds up a pressure within the car and this forces the air in the passenger space through the ceiling outlets into the space between the roof 8 and ceiling 7 and over and in contact with the ducts 6 and then through the roof outlets 18 into the atmosphere.

By arranging the ceiling outlets 17 at the ends of the car and the roof outlets 18 near the center of the car, the entire space between the ceiling and roof is continuously ventilated to prevent the accumulation of heat.

By arranging the centrifugal fan wheels below the ceiling of the car, they are enabled to force the air most efficiently in all directions in the substantially horizontal streams desired. As a result high efficiency is obtained together with the movement of large volumes of air through the passenger space which effectively cools the passengers without drafts.

Preferred results are obtained when the air in the car is changed at least once every minute. In the embodiment illustrated, each fan removes 800 cubic feet per minute resulting in a total movement of 4,000 cubic feet per minute through a car having a capacity of 3,900 cubic feet. The air leaves the fans at a velocity of about 700 feet per minute, yet since the air is directed into the car in substantially horizontal streams, the large volumes of high velocity air produce no drafts or other unpleasant effects upon the passengers.

While one embodiment of the invention has been described for the purpose of illustration, it should be understood that the invention is not limited to the exact apparatus and arrangement of apparatus illustrated and described, since many departures may be suggested by those skilled in the art, without departing from the spirit of the invention.

What is claimed is:

1. A pressure ventilating system for a railway passenger car having a ceiling and a roof above the ceiling, comprising a plurality of longitudinally spaced fans communicating through the ceiling with the passenger space, means forming air passages in the space between said ceiling and roof, connecting said fans with outdoor air, and means including vitiated air inlets in said ceiling between the ends of the car and the outermost of said fans, and vitiated air outlets to the atmosphere in the space between said ceiling and roof adjacent the center of said car for passing vitiated air in contact with the exterior of said passages and for then discharging it from said car.

2. A pressure ventilating system for a railway passenger car having a ceiling and a roof above the ceiling, comprising a plurality of transverse ducts having inlets communicating through the sides of said car with outdoor air and having outlets communicating through said ceiling with the interior of the car, fans in said outlets for drawing air through said inlets for supply into said interior, and means including vitiated air inlets in said ceiling between each end of said car and the outermost of said fans, and vitiated air discharge outlets communicating with the space between said ceiling and roof adjacent the center of said car for passing vitiated air from the interior of said car in contact with the exteriors of said ducts and for then discharging it from said car.

3. A pressure ventilating system for a railway passenger car having a ceiling and a roof above the ceiling, comprising a plurality of transverse ducts having inlets communicating through the sides of said car with outdoor air and having outlets communicating through said ceiling with the interior of said car, said ducts having their upper walls spaced from said roof to form air passages therebetween, fans in said outlets for drawing air through said inlets for supply into said interior, and means including vitiated air inlets in said ceiling between each end of said car and the outermost of said fans, and vitiated air discharge outlets communicating with the space between said ceiling and roof adjacent the center of said car for passing vitiated air from the interior of said car over said ducts and for then discharging it from said car.

CARL O. BERGSTROM.